UNITED STATES PATENT OFFICE.

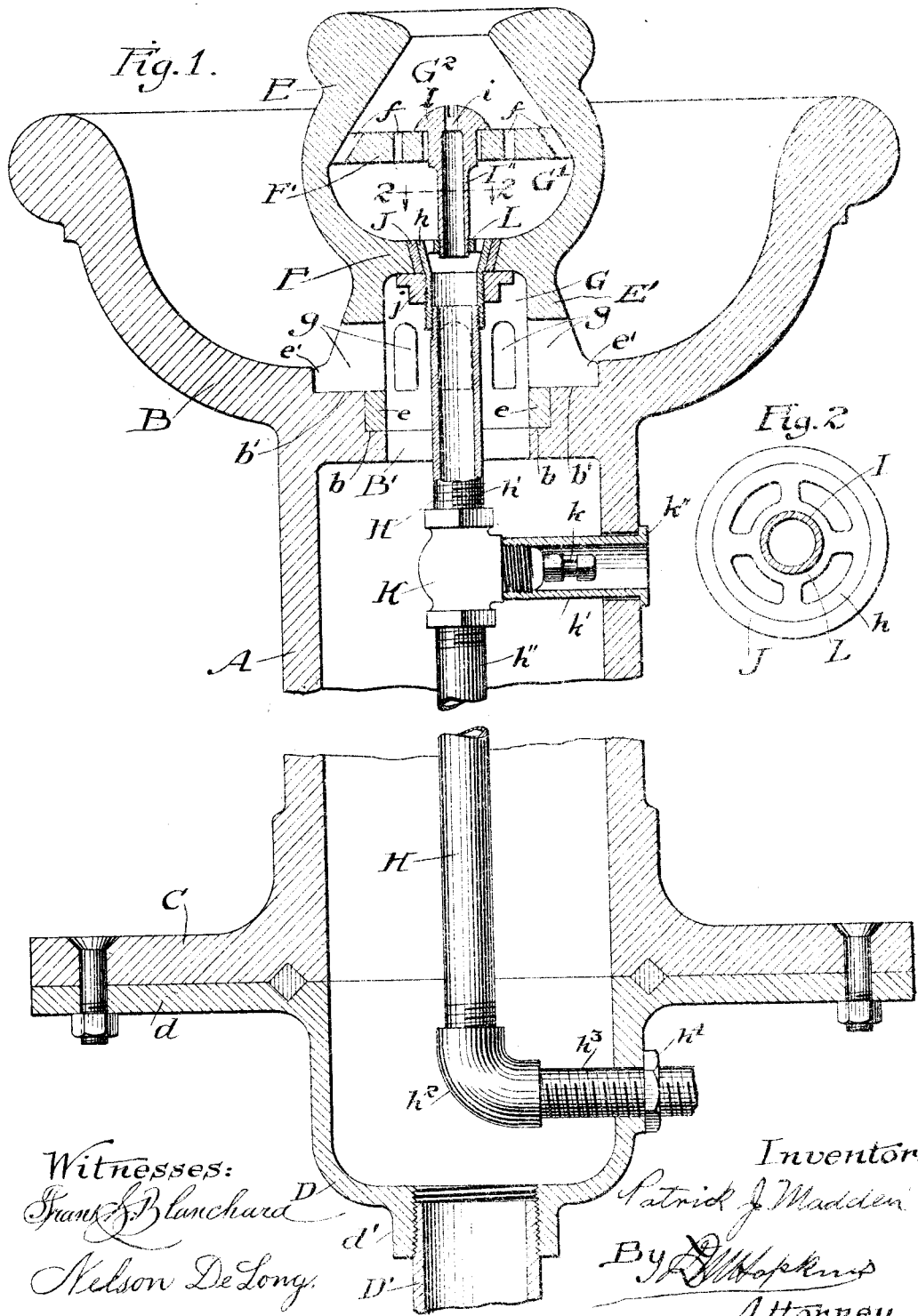

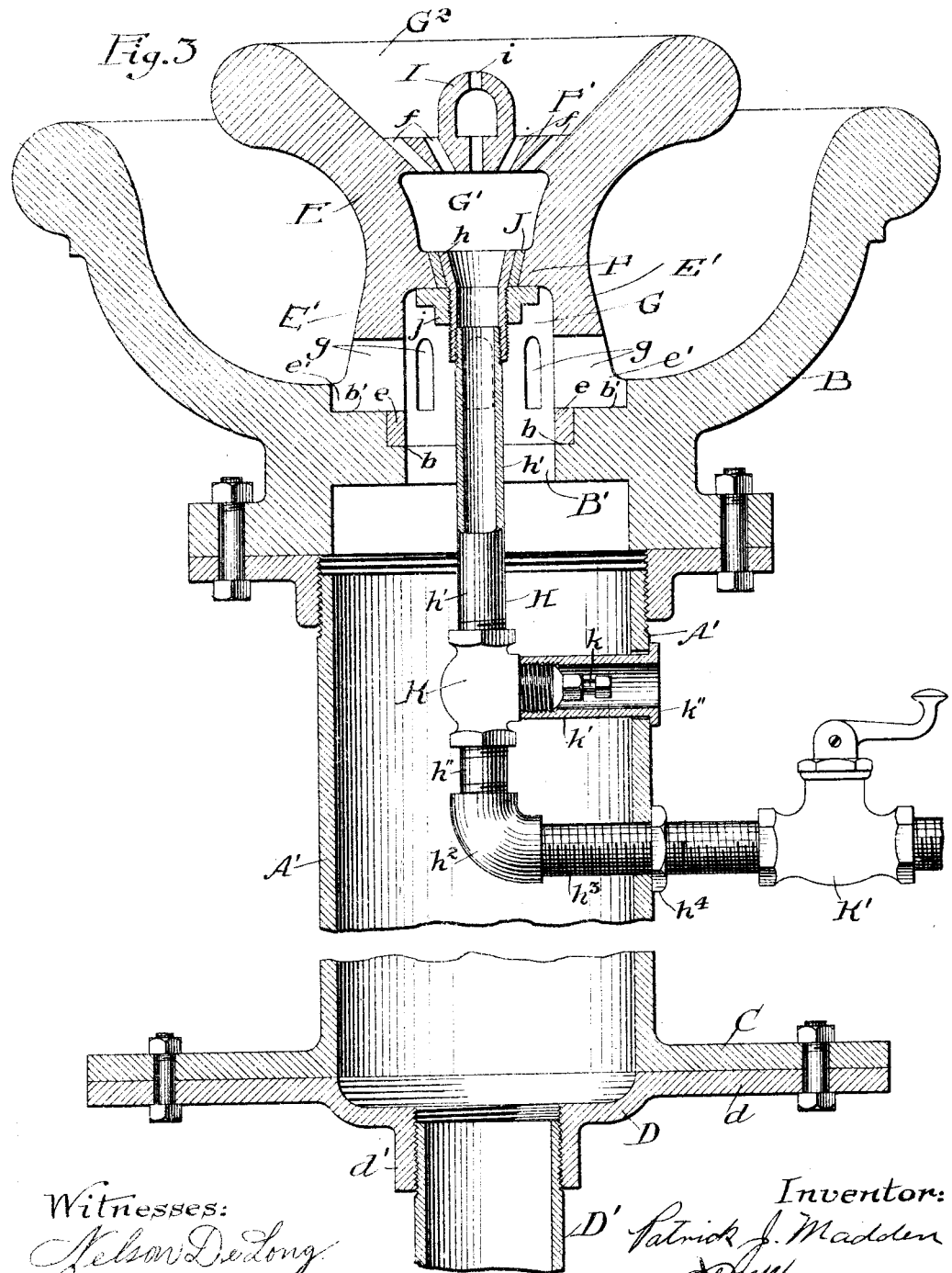

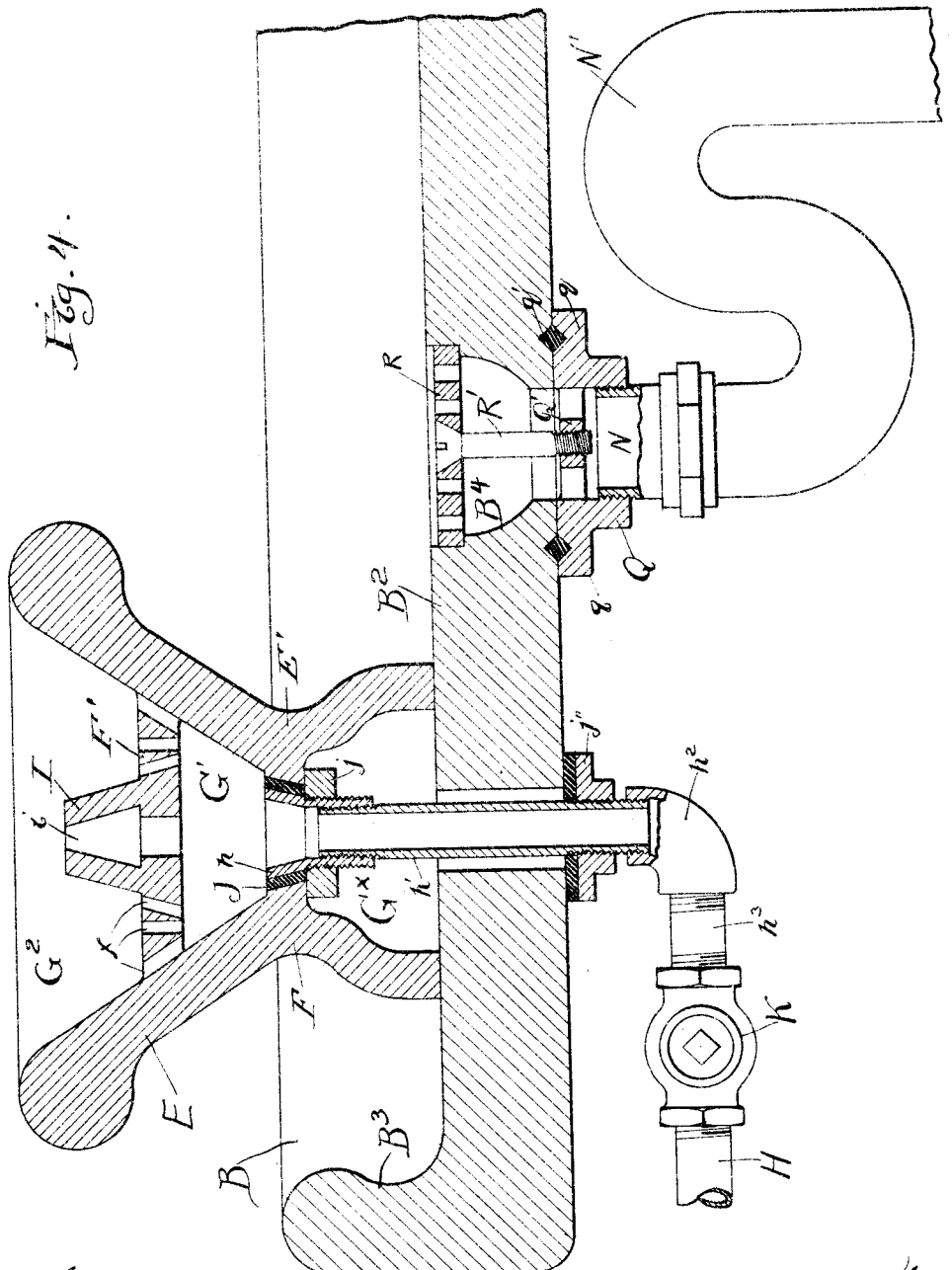

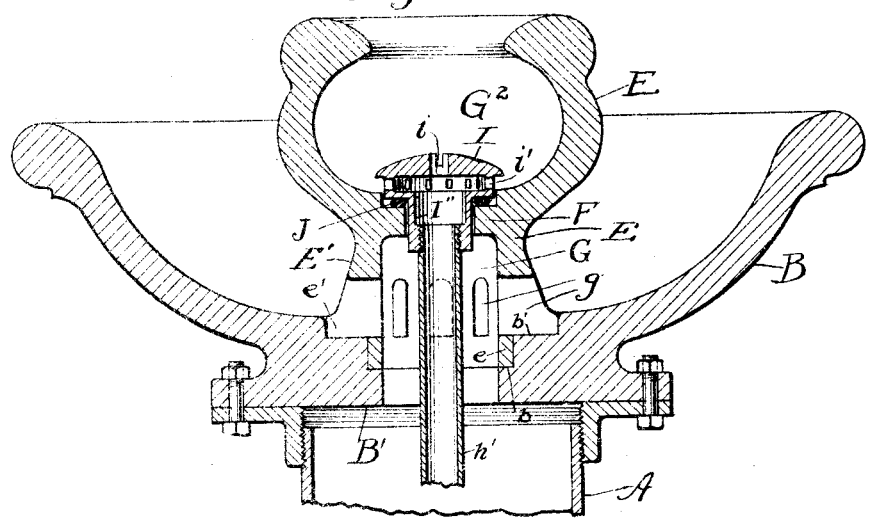
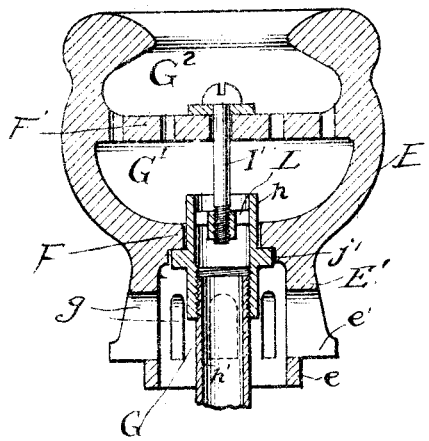
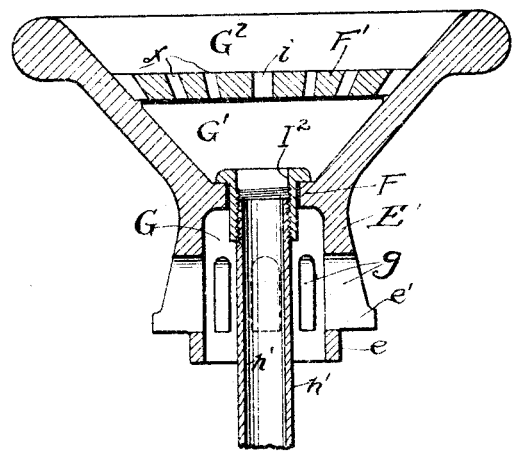

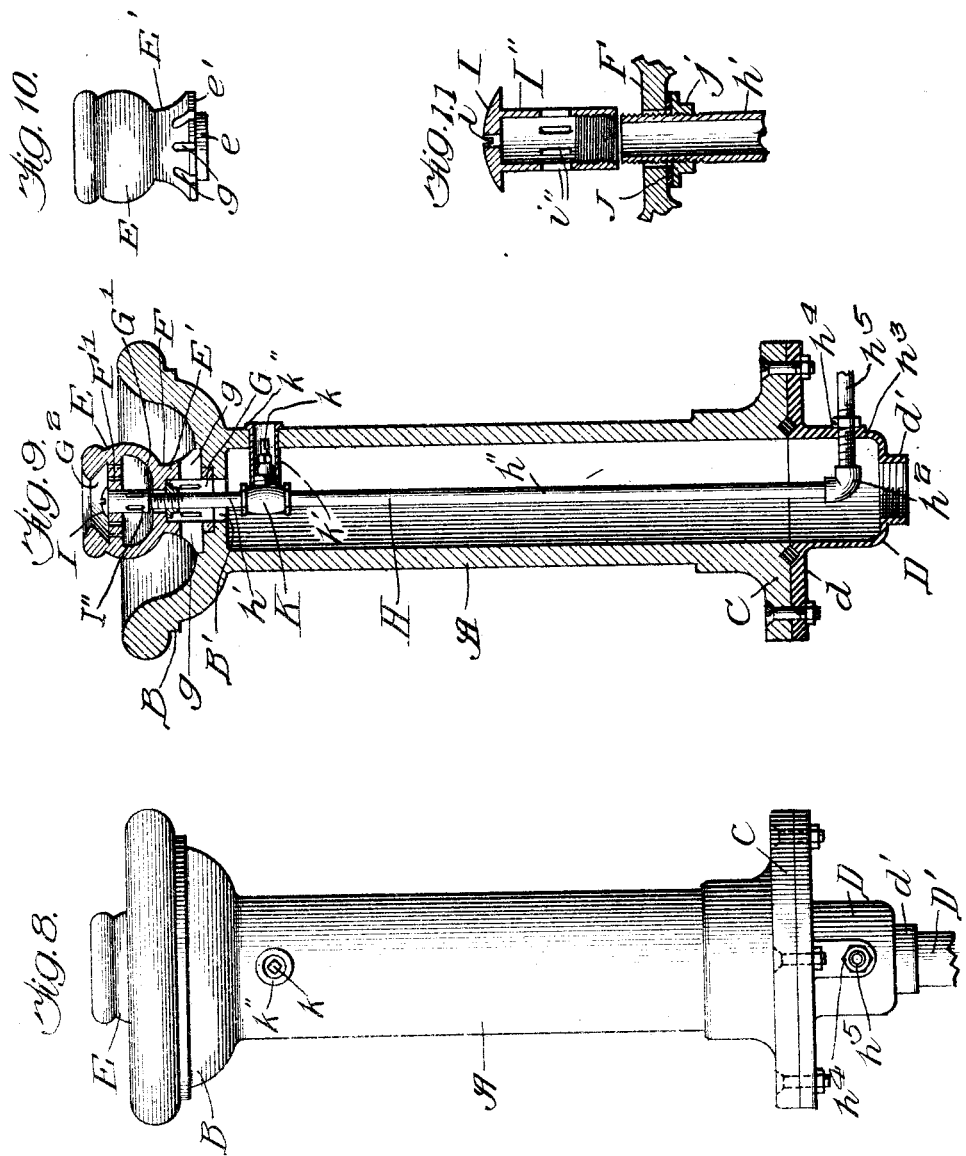

PATRICK J. MADDEN, OF CHICAGO, ILLINOIS.

DRINKING-FOUNTAIN.

1,038,916.   Specification of Letters Patent.   Patented Sept. 17, 1912.

Application filed June 15, 1909. Serial No. 502,391.

*To all whom it may concern:*

Be it known that I, PATRICK J. MADDEN, a citizen of the United States, residing at Chicago, in the county of Cook and State of Illinois, have invented certain new and useful Improvements in Drinking-Fountains, of which the following is a specification.

The objects of the invention, stated generally, are to provide a drinking fountain of improved construction; to provide a drinking cup with a "bubbling" chamber of such construction that the supply water will enter it at the bottom thereof and be constantly kept in a state of violent agitation, thus preventing solids from settling to the bottom and there accumulating or passing into the water-supply passage or passages; to provide a cup of such construction that it will be self-cleansing by causing streams of water to impinge against the inner surface of the walls of the bubbling chamber, whereby they are constantly washed and all solids entering said chamber thrown upward and ejected over the overflow rim; to provide a drinking cup having a bubbling chamber such as described, the top of which is open and surrounded by an over-flow rim of sufficient diameter at its highest point to admit the lips and expose a sufficient superficial area of the body of water in the cup to enable a person to drink directly therefrom; to cause streams of water entering the bubbling chamber to pass upward parallel with the inner surface of the walls of said chamber; to provide simple and efficient means for supporting and holding the cup and the waste water basin in proper relation to each other; and to provide simple and efficient means for forming a suitable connection between the cup and the water supply pipe.

Other objects appear hereinafter.

To these ends the invention consists in the features of novelty which are hereinafter described with reference to the accompanying drawings, which are made a part hereof, and in which:

Figure 1 is a vertical central section of a drinking fountain of the construction which embodies what is elected as the preferred form of the invention, for the purpose of this application. Fig. 2 is a horizontal section thereof on the line 2—2, Fig. 1, looking downward. Fig. 3 is a vertical central section of a drinking fountain of a slightly modified form, embodying some features of the invention, the hollow pedestal and basin being formed in separate parts and secured together. In Figs. 1 and 3 an intermediate portion of the hollow pedestal is broken away. Fig. 4 is a vertical central section of still another modification embodying some features of the invention, in which a hollow pedestal for supporting the basin is not used. Fig. 5 is a vertical central section of still another modification embodying some features of the invention, in which the hollow pedestal and basin are not integral, the lower part of the pedestal being broken away. Fig. 6 is a vertical central section of a cup under still another modification, embodying some features of the invention. Fig. 7 is a vertical central section of a cup and still another modification of the means for attaching the cup to the water-supply pipe and holding the cup in place. Fig. 8 is a side elevation of the improved drinking fountain and which may be taken as a side elevation of the preferred form, shown in Fig. 1 or of the form shown in Fig. 9. Fig 9 is a vertical central section of a drinking fountain of still another modification, embodying some features of the invention. Fig. 10 is a side elevation of a cup of the form shown in Figs. 1, 3 and 9 as they appear in side elevation. Fig. 11 is a vertical central section showing, on a larger scale, the means, shown in Fig. 9, for connecting the cup and water-supply pipe.

A represents a hollow pedestal which is surmounted by a waste water basin B and has at bottom an outwardly presented base flange or foot C which is secured by bolts to a similar outwardly presented flange $d$ of a fitting D which closes the bottom of the pedestal, said fitting having through its bottom a downwardly presented opening surrounded by an internally threaded nipple $d'$ into which is screwed a waste pipe D′, the pedestal and basin being integral and preferably made of glazed or enameled earthenware. The basin has through its bottom an outlet opening B′ which permits the passage of waste water from the interior of the basin to the interior of the hollow pedestal, from which it is carried off through the waste pipe D′. The bottom of the basin has a counter sink $b'$ which is occupied by a ring $e$ formed on the hollow base or foot E′ of the cup E and also a counter sink providing a shoulder $b'$ upon which rests a downwardly presented shoulder $e'$ formed on the base or foot of the cup. Above the base E' is the bottom, F, of the cup proper and above this bottom F is a rose F' which may be constructed in a number of different ways and which constitutes, at one and the same time, the top of the inlet chamber G' and the bottom of the bubbling chamber $G^2$. The base of the cup is hollow providing a chamber, G, and open at bottom so as to be constantly in open communication with the outlet opening B' of the basin, and the walls of the hollow base are provided with lateral openings $g$ through which the lower part or bottom of the basin and the water chamber G communicate. The openings, $g$, preferably extend from a sufficient height downward quite to the upper surface of the bottom of the basin, so that there will be no shoulder that might obstruct or prevent the complete draining of the basin or hinder the passage of solid substances.

The perforations $f$ of the rose F' may be arranged with their axes in suitable or any desired positions relative to the vertical axis of the cup, excepting that the central perforation or jet opening $i$ is concentric with said axis. Preferably, the inner surface of the upper portions of the wall of the bubbling chamber are undercut so that where the undercut occurs said chamber tapers upwardly and inwardly as shown in Figs. 1, 5, 7 and 9 and they may follow either straight or curved lines. Again, the taper may extend quite from top to bottom of the bubbling chamber as shown in Figs. 1 and 9; or it may terminate above the bottom of said chamber and below the level of its termination the inner surface of the chamber may gradually contract or taper downward, as shown in Figs. 5 and 7. Again, the inner surface of the walls of the bubbling chamber may flare upwardly and outwardly from bottom to top, as shown in Figs. 3, 4 and 6.

It has already been stated that the axes of the perforations $f$ of the rose may be arranged in any manner desired or necessary to produce given results. Thus, the outer row or series may be located at or immediately adjacent to the inner surface of the bubbling chamber. They are always at the bottom of the chamber, so that the streams of water issuing from them impinge against and constantly wash and keep clean the side-walls and bottom of the chamber as shown in all of the several modifications. Again, the outer row or series may be arranged with their axes parallel with or in the general direction of the inner surface of the sides of the chamber, so that the streams issuing from them will constantly sweep said surface, as shown in Figs. 1, 3, 4, 5 and 6 or they may be arranged with their axes at a greater or less angle to said inner surface, so that the streams issuing from them will impinge against said surface, as shown in Figs. 1, 7 and 9 and materially assist in washing them.

The bottom of the cup has through it a single centrally located opening resulting in upwardly presented shoulders and this opening may flare upwardly, resulting in an inclined shoulder, as shown in Figs. 1, 3 and 4; or it may be cylindrical, resulting in a flat, horizontal shoulder, as shown in Figs. 5, 6, 9 and 11.

The upwardly presented shoulder, in each instance, affords a bearing for a downwardly presented shoulder on a part which is carried by the water supply pipe, (as, the flaring sleeve $h$ of Figs. 1, 3 and 4, or the tubular stem I'' of Fig. 5, or the sleeve $I^2$ of Fig. 6) so that when said part is drawn down, the water supply pipe being held against upward movement, the cup will be held down on its seat on the basin.

The upwardly presented shoulder, in each instance, forms a bearing for a nut or other part adjustably carried by the water supply pipe, so that when said nut is forced into contact with downwardly presented shoulder a water tight joint will be formed between the water supply pipe and cup. A packing, as J, may be interposed between any two opposing shoulders.

I is a part herein called a nozzle which may be formed integrally with the perforated web or diaphragm F', as shown in Figs. 3 and 4, or separately therefrom as shown in Figs. 1, 5 and 9. In any event it is a part of the rose, and must be so considered as used in this specification, and it is given a distinguishing name simply because of its distinguishing characteristics. It has a central jet opening $i$ communicating with the waterway which, at the point of communication, is considerably larger than said jet opening, resulting in what may be called an enlarged chamber, so that a stream of water passing through the nozzle will be choked by the restricted jet opening and the stream as delivered by the nozzle will be of high velocity and will pass upward through and above the overflow rim of the bubbling chamber, whereby the surface of the water in the bubbling chamber will be caused to well up at the center.

The bubbling chamber or that chamber of the cup which may be drunk from is open at top and surrounded by an over-flow rim over which the water may flow slowly and fall down into the basin, the over-flow rim being of sufficient diameter at its highest point to admit the lips and expose a sufficient superficial area of the water in the chamber to permit a person to drink directly from said chamber, if desired, or from the column which is thrown upward above the level of the over-flow rim by a stream issuing from the jet opening, $i$. The term "over-flow rim" as herein used is intended to comprehend a feature over which a comparatively small body of water is spread out and flows downward, hugging the rim by the force of gravity and does not comprehend the walls of a mere opening or perforation through which a comparatively large body of water is forced, under pressure, so that it does not hug the rim but immediately escapes from it.

The term "waterway" as herein used is intended to include all chambers or passages, of whatever description, through which the water passes on its way from the water supply pipe to the bubbling chamber.

As shown in Figs. 1, 5, 9 and 11 the nozzle has a tubular stem $I''$ and the lower end of this stem communicates with the waterway either directly (Figs. 5, 9 and 11) or indirectly (Fig. 1). As shown in Figs. 1 and 2 the lower end of the tubular stem is screwed to a spider L which is fast in the upper end of the flaring sleeve $h$, which in turn is screwed to the upper end of the upper section $h'$ of the water-supply pipe. As shown in Figs. 9 and 11 it is screwed directly to the water-supply pipe and the inlet chamber $G'$ is supplied through lateral parts or openings $i''$ formed through the sides of the pipe. In all instances the lower end of the tubular stem is open for the reception of supply water.

In the form of the invention shown in Figs. 3 and 4, the rose differs from those just described in that the raised nozzle is integral with the web $F'$ and has now no tubular stem extending downward and communicating with the water-supply pipe. Nevertheless the nozzle has an internal chamber which forms an enlargement of the waterway and the jet opening is restricted as compared therewith. In the form shown in Fig. 5 a single part has the features of both the rose and the nozzle.

In the form shown in Fig. 7 the rose consists wholly of the perforated web or diaphragm $F'$, which is integral with the cup, and has no jet opening or nozzle. The part $I'$ takes the form of a screw bolt which passes through a central opening of the rose downward thereon, so that its head bears downward thereon, while its lower end is screwed into a spider L carried by a short tube or sleeve $h$, the upper end of which communicates with the inlet chamber $G'$, while its lower end is in direct communication with the interior of the next lower section $h'$ of the water-supply pipe, to which it is screwed. The sleeve $h$ has an external shoulder $F'$ which bears upward against the downwardly presented shoulder provided by the opening through the bottom F of the cup, so that by tightening the screw $I'$ the water-supply pipe and cup are firmly secured together. A section $h''$ of the water-supply pipe has, at its upper end, threaded engagement with the casing of the valve K and at its lower end threaded engagement with an elbow $h^2$ into which is screwed the lateral branch $h^3$ of the water-supply pipe. This branch $h^3$ passes horizontally through the side wall of the fitting D and has threaded engagement therewith and a jam nut $h^4$ is turned on to its projecting portion and into firm contact with the side of the fitting D, whereby the vertical portion of the water-supply pipe is maintained in central position relatively to the hollow pedestal and prevented from moving upward. The section of pipe $h^5$, which forms a continuation of the lateral entire branch $h^3$, of the water-supply pipe, may be provided with a valve K', of the self-closing or any other desired type, which must be manually opened in order to permit the flow of water to the cup.

In the form of the invention shown in Fig. 4 the cup is constructed and connected with the water-supply pipe substantially as shown in Figs. 1 and 2 excepting that the lower chamber $G^x$, which corresponds in position with the chamber G of Figs. 1 and 3 does not communicate with the basin, the walls of this chamber being solid and without any openings through which the water could pass from the basin to the interior of the chamber $G^x$, and thence through an outlet opening formed through the bottom of the basin. In all cases, however, the chamber in the base of the cup contains and conceals the pipe connections. In Fig. 4 the basin is preferably of rectangular shape and has a flat bottom $B^2$, from the margin of which rises a low wall $B^3$. Any suitable means for supporting the basin may be used. This basin is large enough to receive and accommodate any desired number of cups. In this and in all other cases the cup extends above the level of the top of the basin so that the overflow rim is accessible. The water overflowing the rim of the cup falls into the basin from which it escapes through an outlet opening $B^4$ which extends through the bottom of the basin and communicates with a waste pipe N, this waste pipe being preferably provided with a trap N'. The upper end of the waste pipe N has threaded engagement with a collar Q having a flange $q$ adapted to bear against the lower side of the bottom of the basin, a rubber packing ring $q'$ being interposed between them. The outlet opening $B^4$ is countersunk at its upper end to provide a shoulder upon which rests a perforated strainer R, through a central opening of which passes a tie-rod R', the lower end of which has threaded engagement with a spider Q' carried by the collar Q. By tightening this tie-rod the strainer is drawn firmly against its seat and at the same time the collar Q is drawn firmly against the lower surface of the bottom of the basin. The water-supply pipe H may pass straight downward to the floor, or its vertical branch may be comparatively short so that the lateral branch $h^3$ will be at a level only slightly below the bottom of the basin, whence it may extend to or through a wall or partition. In this form of the invention a jam nut J'', which is threaded onto a section of the water-supply pipe, bears against the bottom $B^2$ of the basin, through the medium of an elastic packing ring and serves to hold the water-supply pipe against upward movement and thereby hold the cup in place.

In the form of the invention shown in Fig. 6, in order to secure the cup in place in the basin and connect the inlet compartment G' with the water-supply pipe an internally threaded sleeve $I^2$ (which corresponds with the sleeve $h$) is passed through the opening of the web F and into this sleeve is screwed the upper end of the upper member of section $h'$ of the water-supply pipe, the upper end of the sleeve $I^2$ being provided with a radial flange or enlarged head which provides a downwardly presented shoulder which bears upon the shoulder of the cup resulting from the opening through its bottom.

Some features of the invention herein shown and described, but not claimed, and relating more particularly to the construction of the drinking cup and the means for connecting it with its support, are made the subject of some of the claims in my co-pending application which was filed January 5, 1912, under Serial No. 669,587.

Having thus described my invention, the following is what I claim as new therein and desire to secure by Letters Patent:

1. A drinking cup for drinking fountains having a bubbling chamber having at top an opening surrounded by an over-flow rim of sufficient diameter at its highest point to admit the lips; and a rose, located at the bottom of the bubbling chamber, through the perforations of which water is supplied to said chamber, said perforations being so located that the streams issuing from them will impinge against the inner surface of the walls of said chamber.

2. A drinking cup for drinking fountains having a bubbling chamber having at top an opening surrounded by an over-flow rim of sufficient diameter at its highest point to admit the lips; and a rose, located at the bottom of the bubbling chamber, through the perforations of which water is supplied to the said chamber, some of said perforations being so located that the streams issuing from them will impinge against the inner surface of the walls of said chamber at an angle thereto.

3. A drinking cup for drinking fountains having a bubbling chamber provided with an overflow rim, and a rose, located within the cup, through the perforations of which water is supplied to said chamber, some of said perforations being so located that streams issuing from them will impinge against the inner surface of the walls of said chamber in directions substantially parallel therewith.

4. A drinking cup for drinking fountains having a bubbling chamber provided with an overflow rim, and a rose, located within the cup, through the perforations of which water is supplied to said chamber, said perforations being so located that streams issuing from them will impinge against the inner surface of the walls of said chamber, some at an angle thereto and others in directions substantially parallel therewith.

5. A drinking cup for drinking fountains having a bubbling chamber having an overflow rim, and a rose, located in the cup, through the perforations of which water is supplied to the bubbling chamber, said perforations being so located that a stream issuing from one perforation will pass upward through and above the rim of said chamber without impinging against the inner surface of the walls thereof, while other streams will impinge against said inner surfaces in directions substantially parallel therewith.

6. A drinking cup for drinking fountains having a bubbling chamber having at top an opening surrounded by an over-flow rim of sufficient diameter at its highest point to admit the lips; the inner surface of the walls of said chamber being undercut, and a rose, located in the cup, through the perforations of which water is supplied to said chamber, said perforations being so located that streams issuing from them will impinge against the inner surface of the walls of said chamber.

7. A drinking cup for drinking fountains having a bubbling chamber provided with an overflow rim, the inner surface of the walls of said chamber being undercut, and a rose, located in the cup, through the perforations of which water is supplied to said chamber, said perforations being so located that streams issuing from some of them will impinge against said undercut surface at an angle thereto.

8. A drinking cup for drinking fountains having a bubbling chamber provided with an overflow rim, the inner surface of the walls of said chamber being undercut, and a rose, located in the cup, through the perforations of which water is supplied to said chamber, some of said perforations being so located that the streams issuing from them will impinge against the inner surface of the walls substantially parallel therewith.

9. A drinking cup for drinking fountains having a bubbling chamber provided with an overflow rim, the inner surface of the walls of said chamber being undercut, and a rose, located in the cup, through the perforations of which water is supplied to said chamber, some of said perforations being so located that streams issuing from them will impinge against said undercut surface, some at an angle thereto and others substantially parallel therewith.

10. A drinking cup for drinking fountains having a bubbling chamber provided with an overflow rim, the inner surface of the walls of said bubbling chamber being undercut, and a rose located within the cup, through the perforations of which water is supplied to said chamber at least one of said perforations being so located that a stream of water will pass upward through and above the rim of the bubbling chamber without impinging against the inner surface of the walls thereof while other streams will impinge against said undercut surface.

11. A drinking cup for drinking fountains having a bubbling chamber having at top an opening surrounded by an over-flow rim of sufficient diameter at its highest point to admit the lips; and a rose, located within the cup, through the perforations of which water is supplied to said chamber, some of said perforations being so located that streams issuing from them will impinge against the inner surface of the walls of said chamber at the bottom portion thereof.

12. A drinking cup for drinking fountains having a bubbling chamber having at top an opening surrounded by an over-flow rim of sufficient diameter at its highest point to admit the lips; the inner surface of the walls of said chamber being undercut, and a rose, located at the bottom of the bubbling chamber, through the perforations of which water is supplied to said chamber, some of said perforations being so located that streams issuing from them will impinge against the inner surface of the walls of said chamber at the bottom portion thereof.

13. A drinking cup for drinking fountains having a bubbling chamber provided with an overflow rim, the inner surface of the walls of said chamber being undercut, and a rose, located within the cup, through the perforations of which water is supplied to said chamber, said perforations being so located that a stream issuing from one of them will pass upward through and above the rim of the bubbling chamber without impinging against the inner surface of the walls thereof, while others will impinge against said inner surface at an angle thereto, while still others are substantially parallel therewith.

14. A drinking cup for drinking fountains having a bubbling chamber provided with an overflow rim, and a rose, located at the bottom of the bubbling chamber, through the perforations of which water is supplied to said chamber, some of said perforations being so located that streams issuing from them will impinge against the inner surface of the walls of said chamber at the bottom thereof and in directions substantially parallel therewith.

15. A drinking cup for drinking fountains having a bubbling chamber provided with an overflow rim, and a rose, located at the bottom of the bubbling chamber, through the perforations of which water is supplied to said chamber, some of said perforations being so located that streams issuing from them will impinge against the inner surface of the walls of said chamber, some at angles thereto and others substantially parallel therewith.

16. A drinking cup for drinking fountains having a bubbling chamber provided with an overflow rim, and a rose, located at the bottom of the bubbling chamber, through the perforations of which water is supplied to said chamber, said perforations being so located that a stream passes upward through and above the rim of the bubbling chamber while other streams impinge against the inner surface of the walls of said chamber.

17. A drinking cup for drinking fountains having a bubbling chamber provided with an overflow rim, and a rose, located at the bottom of the bubbling chamber, through the perforations of which water is supplied to said chamber, said perforations being so located that a stream passes upward through and above the rim of the bubbling chamber while other streams pass upward substantially parallel with the inner surface of the walls of the chamber.

18. A drinking cup for drinking fountains having at top an opening surrounded by an over-flow rim of sufficient diameter at its highest point to admit the lips, and a web crossing its interior from side to side and dividing it into an inlet chamber and a bubbling chamber of which latter the web forms the bottom, said web having perforations, thereby forming a rose, through which perforations water is supplied to the bubbling chamber from the inlet chamber.

19. A drinking cup for drinking fountains open at top and provided with an overflow rim of sufficient diameter at its highest point to admit the lips and a web crossing its interior from side to side and dividing it into an inlet chamber and a bubbling chamber of which latter the web forms the bottom, said web having perforations, thereby forming a rose, through which perforations water is supplied to the bubbling chamber, said perforations being so located that streams issuing therefrom will impinge against the inner surface of the walls of the bubbling chamber.

20. A drinking cup for drinking fountains open at top and provided with an overflow rim, and a web crossing its interior from side to side and dividing it into an inlet chamber and a bubbling chamber of which latter the web forms the bottom, said web having perforations, thereby forming a rose, through which perforations water is supplied to the bubbling chamber from the inlet chamber, said perforations being so located that a stream of water is discharged upward through and above the overflow rim, while other streams impinge against the inner surface of the side walls of the bubbling chamber.

21. A drinking cup for drinking fountains open at top and provided with an overflow rim and a web crossing its interior from side to side and dividing it into an inlet chamber and a bubbling chamber of which latter the web forms the bottom, the inner surface of the walls of the bubbling chamber being inclined, said web having perforations, thereby forming a rose, through which perforations water is supplied to the bubbling chamber from the inlet chamber, some of said perforations being so located that streams issuing from them will pass upward substantially parallel with said inclined surface of the walls of the bubbling chamber.

22. A drinking cup for drinking fountains open at top and provided with an overflow rim and a web crossing its interior from side to side and dividing it into an inlet chamber and a bubbling chamber of which latter the web forms the bottom, the inner surface of the walls of the bubbling chamber being inclined, said web having perforations, thereby forming a rose, through which perforations water is supplied to the bubbling chamber from the inlet chamber, some of said perforations being so located that streams issuing from them will pass upward substantially parallel with said inclined surface of the walls of the bubbling chamber, while another stream passes upward through and above the overflow rim of the bubbling chamber without impinging against the walls thereof.

23. A drinking cup for drinking fountains open at top and provided with an overflow rim, and a web crossing its interior from side to side and dividing it into an inlet chamber and a bubbling chamber of which latter the web forms the bottom, the inner surface of the walls of the bubbling chamber being undercut, said web having perforations, thereby forming a rose, through which perforations water is supplied to the bubbling chamber at least one of said perforations being so located that a stream of water is discharged upward through and above the overflow rim of the bubbling chamber without impinging against the walls thereof.

24. A drinking cup for drinking fountains open at top and provided with an overflow rim, and a web crossing its interior from side to side and dividing it into an inlet chamber and a bubbling chamber of which latter the web forms the bottom, the inner surface of the walls of the bubbling chamber being undercut, said web having perforations, thereby forming a rose, through which perforations water is supplied to the bubbling chamber at least one of said perforations being so located that a stream of water is discharged upward through and above the overflow rim of the bubbling chamber without impinging against the walls thereof, while other streams impinge against the undercut surface of said walls.

25. A drinking cup for drinking fountains open at top and provided with an overflow rim, and a web crossing its interior from side to side and dividing it into an inlet chamber and a bubbling chamber of which latter the web forms the bottom, the inner surface of the walls of the bubbling chamber being undercut, said web having perforations, thereby forming a rose, through which perforations water is supplied to the bubbling chamber, said perforations being so located that a stream of water is discharged upward through and above the overflow rim of the bubbling chamber without impinging against the walls thereof, while other streams impinge against the undercut surface of said walls, while still others are discharged upward parallel with said undercut surface.

26. A drinking cup for drinking fountains open at top and provided with an overflow rim, and a web crossing its interior from side to side and dividing it into an inlet chamber and a bubbling chamber of which latter the web forms the bottom, the inner surface of the walls of the bubbling chamber being undercut, said web having perforations, thereby forming a rose, through which perforations water is supplied to the bubbling chamber, the outer row of perforations being located immediately adjacent to the upwardly and inwardly inclined surface of walls and with their axes parallel therewith.

27. A drinking cup for drinking fountains having a bubbling chamber, a rose located at the bottom of said chamber and provided with perforations for the passage of water into the bubbling chamber and provided also with a nozzle having a jet opening for discharging a jet of water upward through the bubbling chamber.

28. A drinking cup for drinking fountains having a bubbling chamber and a rose located at the bottom thereof, said rose having a nozzle provided with an internal chamber and a restricted jet-opening adapted to discharge a jet of water upward through the bubbling chamber.

29. A drinking fountain having a drinking cup and a rose dividing the interior of the cup into a bubbling chamber and an inlet chamber, said rose being made of a perforated web joining the sides of the cup and a nozzle formed separately from the web and having an internal chamber and a contracted jet-opening for discharging a jet of water upwardly through the bubbling chamber, the chamber of the nozzle being open for the inlet of water.

30. A drinking fountain having a drinking cup, a rose dividing the interior of the cup into a bubbling chamber and an inlet chamber, said rose being made of a perforated web, joining the cup and a nozzle formed separately from the said web and provided with an internal chamber, a restricted jet opening, and a hollow stem extending downward within the inlet chamber.

31. A drinking cup for drinking fountains having an overflow rim, a hollow base, an opening communicating with the interiors of the cup and hollow base, and lateral openings communicating with the interior of the hollow base, for the inlet of waste water, the hollow base being open at bottom for the outlet of said waste water.

32. A drinking fountain having a drinking cup having an overflow rim, a hollow base, and an opening communicating with the interiors of the cup and base, a water-supply pipe occupying said opening and means for forming a water-tight joint between said cup and supply pipe, said hollow base being open at bottom for the outlet of waste water.

33. A drinking fountain, having a drinking cup having an overflow rim, a hollow base and an opening communicating with the interiors of the cup and base, a water supply pipe occupying said opening, means for connecting said cup and supply pipe, and a basin having an opening for the outlet of waste water, said base being open at bottom and resting upon the basin over its outlet opening, and having lateral openings for the inlet of waste water.

34. A drinking fountain, having a drinking cup having an overflow rim, a hollow base and an opening communicating with the interiors of the cup and base, a water supply pipe occupying said opening, means for connecting said cup and supply pipe, and a basin having an opening for the outlet of waste water, said base being open at bottom and resting upon the basin over its outlet opening, and having lateral openings for the inlet of waste water, the overflow rim of the cup being above the level of the top of the basin.

35. A drinking fountain having a drinking cup, a rose dividing its interior into a bubbling chamber and an inlet chamber through the perforations of which water is supplied to the bubbling chamber, the bottom of the inlet chamber being provided with an opening, a sleeve passing through said opening and having a downwardly presented shoulder, and adapted to seat upon the upwardly presented shoulder resulting from the aforesaid opening, and means for clamping said cup and sleeve together.

36. A drinking fountain having a basin provided with an outlet opening through its bottom, a hollow pedestal with which said opening communicates, a drinking cup, a perforated web dividing the interior of the cup into bubbling and inlet chambers, respectively, located one above the other, said cup having an opening through its bottom resulting in an upwardly presented shoulder, and means acting downwardly against the shoulder and upwardly against the basin for forcing them toward each other and clamping them together, said cup having a hollow base provided with lateral openings for the passage of water to the outlet opening of the basin.

37. A drinking fountain having a basin provided with an opening through its bottom for the outlet of waste water, a hollow pedestal communicating at its upper end with the basin through said outlet opening and having at its lower end an outwardly presented flange, a fitting having an outwardly presented flange secured to the flange of the pedestal and closing its lower end, water-tight, a drinking cup arranged within and supported by the basin and having through its bottom an opening, a water supply pipe secured in said opening and extending through said outlet opening of the basin and downward within the hollow pedestal, said fitting having an opening adapted to communicate with a waste pipe, and means for preventing the vertical movement of the water supply pipe within the pedestal.

PATRICK J. MADDEN.

Witnesses:
JAMES J. McGOOGAN,
F. L. HULME.